United States Patent
Jung et al.

(10) Patent No.: US 9,588,641 B2
(45) Date of Patent: Mar. 7, 2017

(54) METHOD AND APPARATUS FOR UNLOCKING MOBILE TERMINAL

(71) Applicant: Samsung Electronics Co., Ltd, Gyeonggi-do (KR)

(72) Inventors: Hyejeon Jung, Seoul (KR); Kyungjung Kim, Gyeonggi-do (KR); Jaesun Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 14/080,443

(22) Filed: Nov. 14, 2013

(65) Prior Publication Data

US 2014/0137049 A1    May 15, 2014

(30) Foreign Application Priority Data

Nov. 14, 2012    (KR) ........................ 10-2012-0128613

(51) Int. Cl.
  *G06F 3/0488*    (2013.01)
  *G06F 3/0481*    (2013.01)
  (Continued)

(52) U.S. Cl.
  CPC ........ *G06F 3/04817* (2013.01); *G06F 3/0486* (2013.01); *G06F 3/0488* (2013.01); *G06F 3/04883* (2013.01); *G06F 21/31* (2013.01); *G06F 21/316* (2013.01); *G06F 21/36* (2013.01); *G06F 21/629* (2013.01); *G06F 21/74* (2013.01); *H04W 12/06* (2013.01); *G06F 2221/2105* (2013.01); *G06F 2221/2147* (2013.01); *H04W 88/02* (2013.01)

(58) Field of Classification Search
  CPC ... G06F 3/04817; G06F 3/0488; G06F 3/0481
  See application file for complete search history.

(56) References Cited

U.S. PATENT DOCUMENTS 8,504,842 B1 *   8/2013   Meacham ..................... 713/183
8,904,479 B1 * 12/2014   Johansson et al. ............... 726/2
(Continued)

FOREIGN PATENT DOCUMENTS

SE   WO 2008082354 A1 *  7/2008  ............ G06F 21/31
WO   WO2012/093784 A2    7/2012

OTHER PUBLICATIONS

DannyD, Galaxy SII GT-I9100 Ice Cream Sandwich Guide (Version 6), May 8, 2012, sammobile.com, p. 40, https://web.archive.org/web/20120511044707/http://www.sammobile.com/2012/05/08/gt-i9100-ice-cream-sandwich-guide-version-6 linking to http://www.sammobile.com/wp-content/uploads/2012/05/Galaxy-S2-EUR-OPENGT-I9100-Ice-Cream-Sandwich-Guide-Ver-6.0.pptx.*

(Continued)

Primary Examiner — William Bashore
Assistant Examiner — Daniel Parcher

(57) ABSTRACT

A method and apparatus for unlocking a mobile terminal can immediately execute a specific application at a lock screen. The method of unlocking a mobile terminal includes: outputting a lock screen including an icon area in which at least one icon representing an application is displayed and a pattern area that receives a pattern gesture input for unlocking; sensing a touch signal that moves a specific icon displayed in the icon area to the pattern area; determining whether a first pattern gesture for unlocking is input to the pattern area without release of the touch signal; determining, if a first pattern gesture is input, whether the input first pattern gesture corresponds with a preset unlock pattern gesture; and unlocking, if the input first pattern gesture corresponds with a preset unlock pattern gesture, the mobile terminal and executing an application corresponding to the specific icon.

20 Claims, 4 Drawing Sheets

(51) Int. Cl.
*G06F 21/31* (2013.01)
*G06F 21/36* (2013.01)
*G06F 21/62* (2013.01)
*G06F 21/74* (2013.01)
*H04W 12/06* (2009.01)
*G06F 3/0486* (2013.01)
*H04W 88/02* (2009.01)

(56) References Cited

U.S. PATENT DOCUMENTS

| | | | |
|---|---|---|---|
| 2010/0001967 A1* | 1/2010 | Yoo | 345/173 |
| 2010/0269040 A1* | 10/2010 | Lee | 715/702 |
| 2010/0306718 A1 | 12/2010 | Shim et al. | |
| 2012/0046077 A1* | 2/2012 | Kim | H04M 1/72577 455/566 |
| 2013/0067376 A1* | 3/2013 | Kim et al. | 715/769 |
| 2013/0191911 A1* | 7/2013 | Dellinger et al. | 726/19 |

OTHER PUBLICATIONS

Extended European Search Report issued Mar. 28, 2014 in connection with European Patent Application No. 13192700.6-1870—7 pages.
GT-19100 "Ice Cream Sandwich (ICS) Guide for Customers" Customer Consultant Guide Android Mobile Technology Platform; ver. 2.0 Global CS ECC HHP review, Mar. 16, 2012 42 pgs.

* cited by examiner

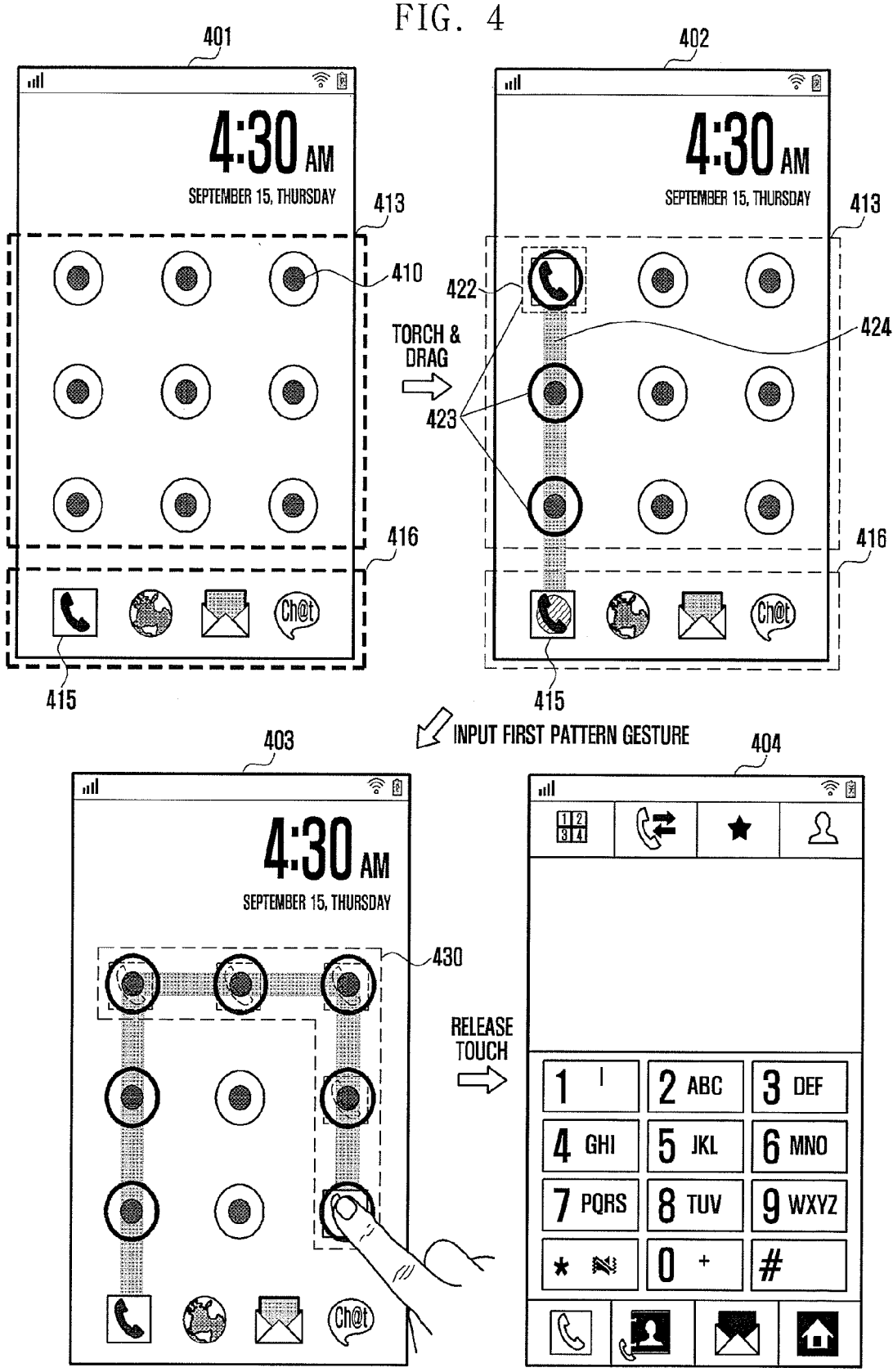

METHOD AND APPARATUS FOR UNLOCKING MOBILE TERMINAL

CROSS-REFERENCE TO RELATED APPLICATION(S) AND CLAIM OF PRIORITY

The present application is related to and claims the benefit under 35 U.S.C. §119(a) of a Korean Patent Application filed on Nov. 14, 2012 in the Korean Intellectual Property Office and assigned Serial No. 10-2012-0128613, the entire disclosure of which is hereby incorporated by reference.

TECHNICAL FIELD

The present disclosure relates to a method and apparatus for unlocking a mobile terminal, and more particularly, to a method and apparatus for unlocking a mobile terminal that can immediately execute a specific application at a lock screen.

BACKGROUND

Mobile terminals support a communication function based on mobility and are very widely used based on convenience of use and easy of portability. Further, the mobile terminal may store a large amount information according to use. For example, a user may store personal information and information related to business in the mobile terminal. In this way, as users store personal information and business related information in mobile terminals, in order to protect the personal information, a mobile terminal supports a lock function. Further, in order to prevent the problem of an erroneous operation occurring due to an unintended touch input, when no input exists during a predetermined time period (e.g., 5 seconds), the mobile terminal enters a lock state.

When the mobile terminal is in a lock state, a user should release the lock state through a password input, a gesture input of a specific pattern, and face recognition. In this way, when executing a specific application in a lock state, the user of a mobile terminal that provides a lock function should release the lock state and execute the specific application. That is, the method of unlocking a mobile terminal is an inconvenience in which a plurality of input actions are performed in order to execute a specific application in a lock state.

SUMMARY

To address the above-discussed deficiencies, embodiments of the present disclosure provide a method and apparatus for unlocking a mobile terminal that can more quickly and simply execute a specific application in a lock state of the mobile terminal.

Certain embodiments of the present disclosure include a method of unlocking a mobile terminal includes: outputting a lock screen including an icon area in which at least one icon representing an application is displayed and a pattern area that receives a pattern gesture input for unlocking; sensing a touch signal that moves a specific icon displayed in the icon area to the pattern area; determining whether a first pattern gesture for unlocking is input to the pattern area without release of the touch signal; determining, if a first pattern gesture is input, whether the inputted first pattern gesture corresponds with a preset unlock pattern gesture; and unlocking, if the inputted first pattern gesture corresponds with a preset unlock pattern gesture, the mobile terminal and executing an application corresponding to the specific icon.

Certain embodiments of the present disclosure include an apparatus for unlocking a mobile terminal includes: a display unit for displaying a locking screen including an icon area in which at least one icon representing an application is displayed and a pattern area for receiving a pattern gesture input for unlocking; a touch panel for recognizing a touch input at the lock screen; and a controller for sensing a touch signal for moving a specific icon displayed in an icon area of the lock screen to the pattern area and for determining whether a first pattern gesture input to the pattern area without release of the sensed touch signal corresponds with a preset unlock pattern gesture and for unlocking the mobile terminal, if a first pattern gesture corresponds with a preset unlock pattern gesture and for controlling to execute an application corresponding to the specific icon.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates screen captures for displayed for a method of unlocking the mobile terminal of FIG. 1.

DETAILED DESCRIPTION

Figure 1:
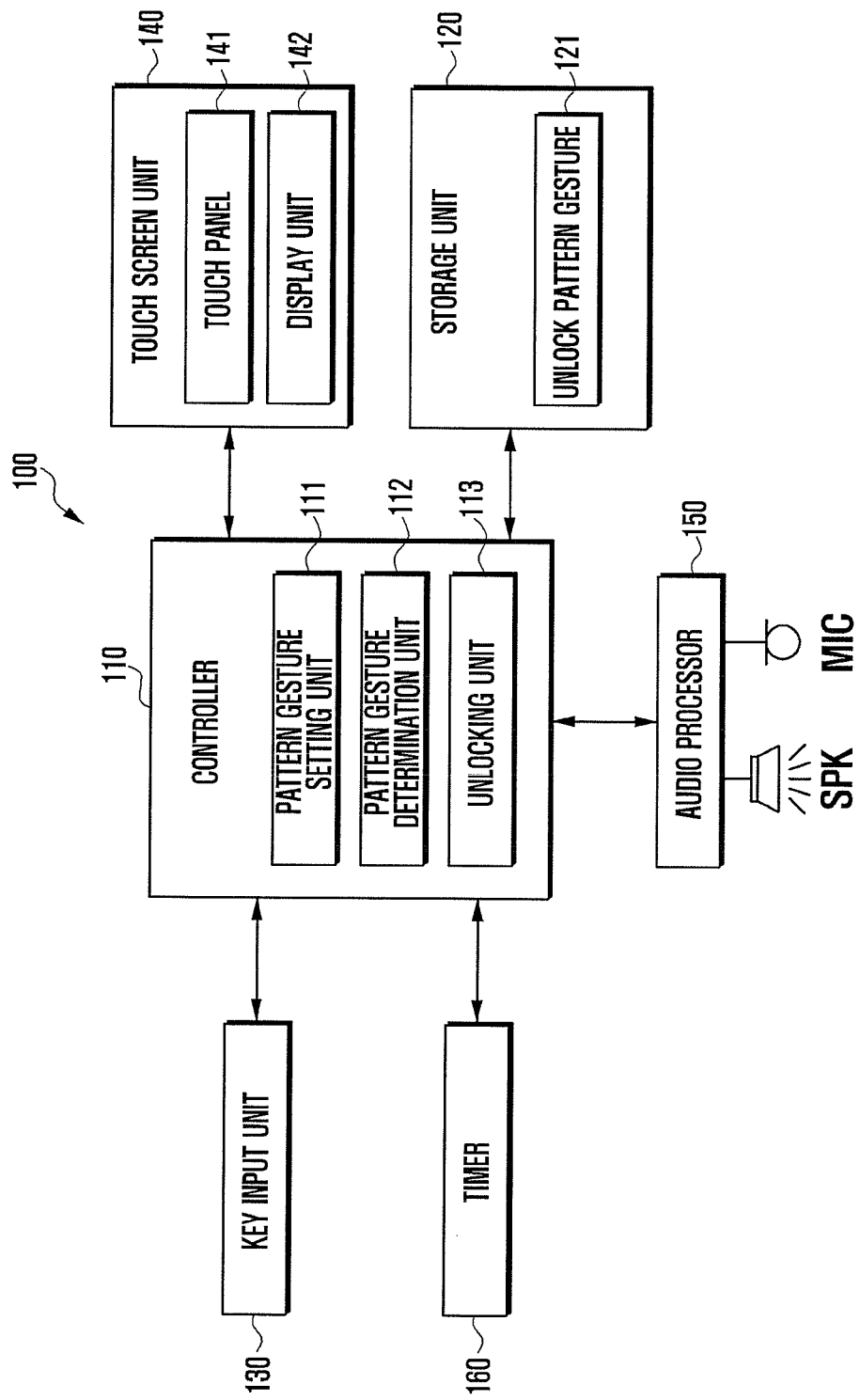
FIG. 1 illustrates a configuration of a mobile terminal according to embodiments of the present disclosure.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile device. Hereinafter, embodiments of the present disclosure are described in detail with reference to the accompanying drawings. The same reference numbers are used throughout the drawings to refer to the same or like parts. The views in the drawings are schematic views only, and are not intended to be to scale or correctly proportioned. Detailed descriptions of well-known functions and structures incorporated herein may be omitted to avoid obscuring the subject matter of the present disclosure.

A mobile terminal according to the present can be a mobile communication terminal, smart phone, personal digital assistant (PDA), tablet personal computer (tablet PC), and portable multimedia player (PMP).

In the present disclosure, a lock state is used for preventing unintended or unverified use of a terminal or for activating or inactivating a function of a mobile terminal. That is, when the mobile terminal is in a lock state, until the mobile terminal unlocks through a previously defined unlocking method, the mobile terminal responds to only a limited user input such as such as power on/off and display on/off. In this case, the mobile terminal outputs a lock screen notifying a lock state and receives a user's gesture input for unlocking through the lock screen. The lock screen includes an icon area and a pattern area. The icon area is an area in which at least one icon corresponding to a specific application is displayed, and the pattern area is an area that receives a pattern gesture input for unlocking.

In the present disclosure, a pattern gesture is an action in which a user performs a touch movement with a specific pattern in a pattern area of a lock screen using a touch input device.

In the present disclosure, a dormant state is a state in which a pattern input is impossible. When a pattern inputted for unlocking is wrong the preset number of times (e.g., 5) or more on a lock screen, the mobile terminal enters a dormant state. The entrance to the dormant state is to prevent another user from releasing a lock state of a mobile terminal through a plurality of pattern inputs.

FIG. 1 illustrates a configuration of a mobile terminal according to embodiments of the present disclosure.

Referring to FIG. 1, a mobile terminal 100 according to embodiments of the present disclosure includes a controller 110, storage unit 120, key input unit 130, touch screen unit 140, audio processor 150, and timer 160.

The touch screen unit 140 includes a touch panel 141 and a display unit 142, and the controller 110 includes a pattern gesture setting unit 111, pattern gesture determination unit 112, and unlocking unit 113, and the storage unit 120 stores an unlock pattern gesture 121 set by a user for unlocking.

The timer 160 counts a preset time in an idle state, dormant state, or lock state and outputs a count expiration signal to the controller 110 when the count is expired. For example, in a state in which the touch screen unit 140 is activated, when an input is not sensed for a predetermined time period (e.g., 5 seconds), the timer 160 may count a preset time (e.g., 0.5 seconds) and transmit a count expiration signal to the controller 110 when the count is expired. The controller 110, having received the count expiration signal turns off the touch screen unit 140 and enters a lock state.

Further, in a state in which a lock screen is output, when no input exists, the timer 160 counts a preset time (e.g., 10 seconds) and transmits a count expiration signal to the controller 110 when the count is expired. In this case, the controller 110 turns off the touch screen unit 140.

Further, when the mobile terminal 100 enters a dormant state, the timer 160 counts a preset time period (e.g., 30 seconds) and outputs a count expiration signal to the controller 110 when the count is expired. In this case, the controller 110 releases a dormant state.

The audio processor 150 includes a speaker SPK for outputting transmitted and received audio data when communicating, audio data included in a message, and audio data stored at the storage unit 120. The audio processor 150 includes a microphone MIC for collecting a user's sound or other audio signals when communicating. Particularly, when unlocking has succeeded or failed, the audio processor 150 outputs a sound effect notifying of an unlock occurrence of mobile terminal 100. The sound effects can be disabled according to a user setting.

The touch screen unit 140 includes the touch panel 141 and the display unit 142. In certain embodiments, the touch screen unit 140 includes the touch panel 141 disposed at an entire surface of the display unit 142. In certain embodiments, the touch screen unit 140 has an integral form structure.

The touch screen unit 140 according to the present disclosure is not limited to the above-described structure and can have various structures.

The touch panel 141 is a device for recognizing a user's touch input and includes a plurality of sensors arranged in a matrix form. The touch panel 141 incurs a touch event by sensing a contact or approach of a touch input device (e.g., a finger or a stylus pen) through a plurality of touch sensors and outputs the incurred touch event to the controller 110. Particularly, the touch panel 141 senses a touch signal (e.g., touch and drag) that moves a specific icon of an icon area of a lock screen to a pattern area. Further, the touch panel 141 senses an input of a pattern gesture through a pattern area of a lock screen. A pattern gesture for unlocking includes a first pattern gesture input in a state in which the specific icon is touched and a second pattern gesture input without touch of a specific icon.

The display unit 142 displays various menus of the mobile terminal 100 and information inputted by a user or information provided to a user. That is, the display unit 142 displays various screens (e.g., a lock screen, main menu screen, or home screen) according to use of the mobile terminal 100. The display unit 142 can include a liquid crystal display and an organic light emitting diode (OLED). The display unit 142 outputs a lock screen for unlocking, an error image notifying that an input error of a pattern gesture occurs, and a dormant image notifying a dormant state when the error occurs the preset number of times (e.g., 5 times) or more.

The lock screen includes a pattern area that receives a pattern gesture input for unlocking and an icon area in which at least one icon corresponding to an application is displayed. The pattern area includes a plurality of pattern points arranged in multi-row and multi-column layouts. In this case, a pattern gesture for the unlocking is formed by connecting at least two pattern points. Icons displayed in the icon area may be changed by a user.

When a pattern gesture is input at a lock screen, the display unit 142 visually displays a moving path (for example, as shown in screen 402 or 403 of FIG. 4 described below). Further, when a specific icon is touched in an icon area, and the touch is moved to a pattern area in a maintained state, and when unlocking is performed by inputting a first pattern gesture for unlocking, the display unit 142 displays an execution screen of an application corresponding to the selected specific icon. For example, after being moved to a pattern area by touching an outgoing call icon of an icon display area, when the first pattern gesture is input, the display unit 142 displays an outgoing call screen (see a screen 404 of FIG. 4 to be described later).

At general unlocking, in which a second pattern gesture for unlocking is immediately input to a pattern area of the lock screen, the display unit 142 displays a screen before entering a lock state. For example, when entering a lock state at a text message writing screen, the display unit 142 outputs a text message writing screen at general unlocking.

The key input unit 130 generates an input signal according to a user's key manipulation for controlling the mobile terminal 100 and outputs the input signal to the controller 110. The key input unit 130 includes a button type keypad including alphanumeric keys and a navigation key and a function key formed at one side of the mobile terminal 100. The function key includes a volume adjustment key, camera key, and power key.

Further, the key input unit 130 includes a menu key that requests display of a menu that can be executed at a present screen, cancel key that requests to return to a previous step, and home key that requests display of a home screen at a lower end portion of the touch screen unit 140. The menu key, cancel key, and home key can be embodied as a touch key or a button type physical key.

The key input unit 130 can include an input means, such as a QWERTY keypad, 3×4 keypad, 4×3 keypad, ball joystick, optical joystick, wheel key, touch key, touch pad, and touch screen or a combination thereof. When the mobile terminal 100 supports a full touch screen, the key input unit 130 can include only a volume key (for adjusting the volume) formed at a side surface of a case of the mobile terminal 100 and a function key for turning on/off a screen and for turning on/off power.

The storage unit 120 stores an operating system (OS) of the mobile terminal 100, an application program necessary for other option functions, for example, a sound reproduction function, image or moving picture reproduction function, and broadcasting reproduction function, user data, and transmitted and received data when communicating. For example, the storage unit 120 can store a moving picture file, game file, music file, and movie file. Particularly, as shown in FIG. 1, the storage unit 120 stores a unlock pattern gesture 121 for unlocking. The unlock pattern gesture 121 can be set and stored by a user. For this, the storage unit 120 stores a pattern image including a plurality of pattern points arranged in multi-row and multi-column layouts (e.g., 3×3 matrix form). The user may set the unlock pattern gesture 121 by connecting at least two pattern points (preferably 4) of the plurality of pattern points in a pattern gesture setting mode. In this case, the storage unit 120 stores position information of pattern points existing on a path from a start position of the unlock pattern gesture 121 to a termination position. Such pattern gesture setting is well-known technology and therefore a detailed description thereof is omitted.

The controller 110 controls general operations of the mobile terminal 100 and signal flow between internal elements of the mobile terminal 100 and performs a data processing function. For example, the controller 110 can be a central processing unit (CPU), micro processor unit (MPU), and application processor. The controller 110 controls the unlock procedure that can immediately execute a specific application a user wants at a lock screen. In more detail, in a lock state in which the touch screen unit 140 is turned off, when a key input signal is received from the key input unit 130, the controller 110 controls the touch screen unit 140 to display a lock screen. When the lock screen is displayed, the controller 110 determines whether a first pattern gesture for unlocking is input. For example, the controller 110 may recognize, through the touch screen unit 140, a touch of a specific icon occurring in an icon area of a lock screen, touch movement that moves the touched specific icon to the pattern area, and a first pattern gesture input in the pattern area in a state in which the touch is maintained. Thereafter, the controller 110 compares the recognized first pattern gesture with a preset unlock pattern gesture 121 and unlocks the mobile terminal and executes an application corresponding to a specific icon when the recognized first pattern gesture corresponds with a preset unlock pattern gesture 121. When a second pattern gesture for general unlocking is input, the controller 110 unlocks the mobile terminal and controls the display unit 142 to output a screen before entering a lock state. For this, the controller 110 includes the pattern gesture setting unit 111, pattern gesture determination unit 112, and unlocking unit 113.

The pattern gesture setting unit 111 sets a pattern gesture input by a user in a pattern gesture setting mode to the unlock pattern gesture 121 and stores this at the storage unit 120. In more detail, when a pattern gesture setting mode is activated, the pattern gesture setting unit 111 controls the touch screen unit 140 to output a pattern image including a plurality of pattern points arranged in multi-row and multi-column layouts (e.g., 3×3 matrix form). Thereafter, the pattern gesture setting unit 111 sets a user's gesture input that connects at least two (preferably 4) pattern points of the plurality of pattern points as the unlock pattern gesture 121. The unlock pattern gesture setting may be repeated multiple times (e.g., 2 times).

The pattern gesture determination unit 112 recognizes a user's gesture inputted in a pattern area of a lock screen. In this case, when a user's pattern gesture is immediately inputted on the pattern area, the pattern gesture determination unit 112 may recognize the user gesture as a pattern gesture from a time point at which a touch is sensed. However, in a state in which the specific icon is touched, when a pattern gesture is input, the pattern gesture determination unit 112 determines whether the specific icon is moved to a start position of the unlock pattern gesture 121 and recognizes the user gesture as a pattern gesture input from a time point at which the specific icon is moved to a start position of the unlock pattern gesture 121. When a user touches a specific icon and moves the touch to a pattern area, this is to prevent inconvenience in which the user should move to a start position of the unlock pattern gesture 121 while deviating a pattern point, not a start position of the unlock pattern gesture 121.

The pattern gesture determination unit 112 determines whether a first pattern gesture or a second pattern gesture of a user input in a pattern area of a lock screen corresponds with the preset unlock pattern gesture 121.

If a first pattern gesture or a second pattern gesture of a user input in a pattern area of a lock screen corresponds with the preset unlock pattern gesture 121, the pattern gesture determination unit 112 unlocks the mobile terminal and transmits an execution request, or an unlocking request of an application corresponding to a touched specific icon to the unlocking unit 113.

If a first pattern gesture or a second pattern gesture of a user input in a pattern area of a lock screen does not correspond with the preset unlock pattern gesture 121, the unlock pattern gesture 121 controls to perform an error processing.

If the first pattern gesture input at a lock screen corresponds with a preset unlock pattern gesture, the unlocking unit 113 unlocks the mobile terminal and executes an application. Specifically, after a specific icon is touched in an icon area of the lock screen and the touch is moved to the pattern area, in a state in which the touch is maintained, if the input first pattern gesture of the user corresponds with a preset unlock pattern gesture, the unlocking unit 113 unlocks the mobile terminal and controls to execute an application corresponding to the specific icon. In this way, a specific application in which the user wants can be quickly and simply executed through a continued touch input of one time on a lock screen, and thus, user convenience is improved.

If a second pattern gesture immediately input in the pattern area without touch of a specific icon on the lock screen corresponds with the unlock pattern gesture, the unlocking unit 113 unlocks the mobile terminal. In this case, the display unit 142 outputs a screen immediately before entering a lock state.

Although not shown in FIG. 1, the mobile terminal 100 can also include constituent elements having an additional function, such as a global positioning system (GPS) module for receiving position information, broadcasting receiving module for receiving broadcasting, digital sound source reproduction module such as an MP3 module, Internet communication module for performing an Internet function, and motion sensor module for sensing a motion of the mobile terminal.

Figure 2:
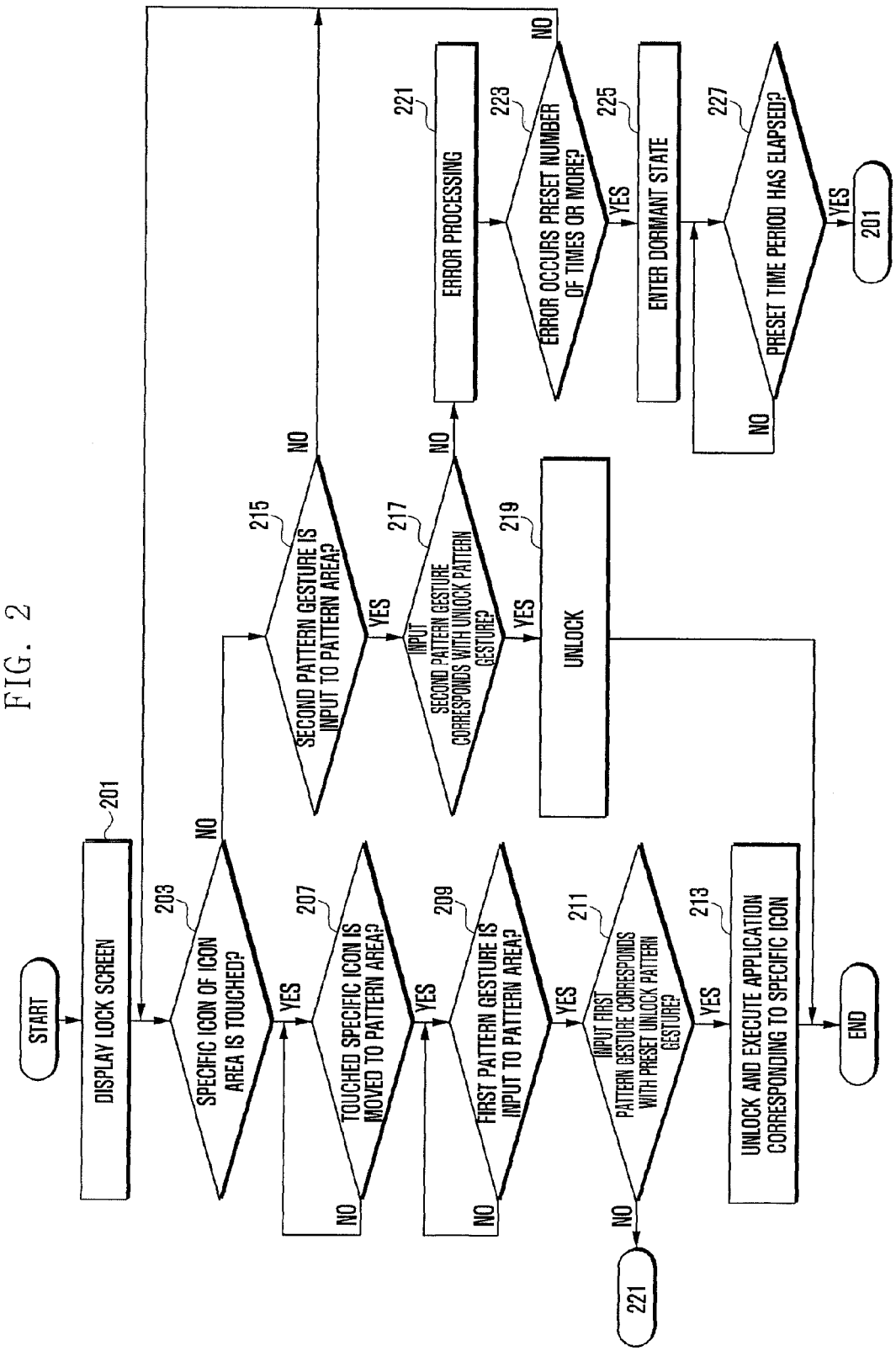
FIG. 2 illustrates a process of unlocking the mobile terminal of FIG. 1.

FIG. 2 illustrates a method of unlocking the mobile terminal of FIG. 1.

Referring to FIGS. 1 and 2, the controller 110 according to embodiments of the present disclosure controls to display a lock screen in block 201. For example, in a state in which the display unit 142 is turned off, when a physical key (e.g., a home key and a volume key) is actuated, the lock screen is displayed. The lock screen includes a pattern area that receives a pattern gesture input for unlocking and an icon area that displays at least one icon corresponding to an application.

The controller 110 determines whether a specific icon of the icon area is touched in block 203.

If a specific icon of the icon area is touched, the controller 110 determines whether the touched specific icon is moved (e.g., drag) to the pattern area in block 207.

If the touched specific icon is not moved to the pattern area, the controller 110 remains in block 207.

Although not shown, in block 207, in a state in which the specific icon is not moved to a pattern area, when the touch is released, the controller 110 do not perform an operation and the process returns to block 203.

If the touched specific icon is moved to the pattern area, the controller 110 determines whether a first pattern gesture for unlocking is inputted on the pattern area without touch release of the specific icon in block 209.

If a first pattern gesture for unlocking is not inputted on the pattern area, the controller 110 remains at block 209.

If a first pattern gesture for unlocking is input on the pattern area, in block 211 the controller 110 determines whether the input first pattern gesture corresponds with the preset unlock pattern gesture 121.

If the inputted first pattern gesture does not correspond with the preset unlock pattern gesture 121, the process progresses to block 221.

If the input first pattern gesture corresponds with the preset unlock pattern gesture 121, the controller 110 unlocks the mobile terminal and executes an application corresponding to a specific icon in block 213.

If a specific icon of the icon area is not touched at block 203, the controller 110 determines whether a second pattern gesture for unlocking is input in the pattern area in block 215.

If a second pattern gesture for unlocking is not input in the pattern area, the process returns to block 203 and the above-described processes are repeated.

If a second pattern gesture for unlocking is input in the pattern area, the controller 110 determines whether the input second pattern gesture corresponds with the unlock pattern gesture 121 in block 217.

If the input second pattern gesture corresponds with the unlock pattern gesture 121, the controller 110 unlocks the mobile terminal (219). In this case, the display unit 142 displays a screen before entering a lock state. For example, when the mobile terminal 100 enters from a text message writing screen to a lock state, the display unit 142 displays a text message writing screen upon unlocking.

If the input second pattern gesture does not correspond with the unlock pattern gesture 121 at block 217, the controller 110 performs an error processing in block 221. For example, the controller 110 controls the display unit 142 to output an error message window or controls the display unit 142 to change a background color of a lock screen and notifies of an error.

The controller 110 determines whether the error occurs the preset number of times (e.g., 5 times) or more in block 223.

If the error occurs less than the preset number, the process returns to block 203 and the above-described processes are repeated.

If the error occurs the preset number of times (e.g., 5 times) or more, the controller 110 controls the mobile terminal to enter a dormant state in block 225. In this case, the display unit 142 outputs a dormant image notifying that a pattern input is impossible.

The controller 110 determines whether a preset time period (e.g., 30 seconds) has elapsed in block 227.

If a preset time period (e.g., 30 seconds) has not elapsed, the controller 110 remains at block 227.

If a preset time period (e.g., 30 seconds) has elapsed, the controller 110 releases the dormant state, and the process returns to block 201 and the above-described processes are repeated.

Figure 3:
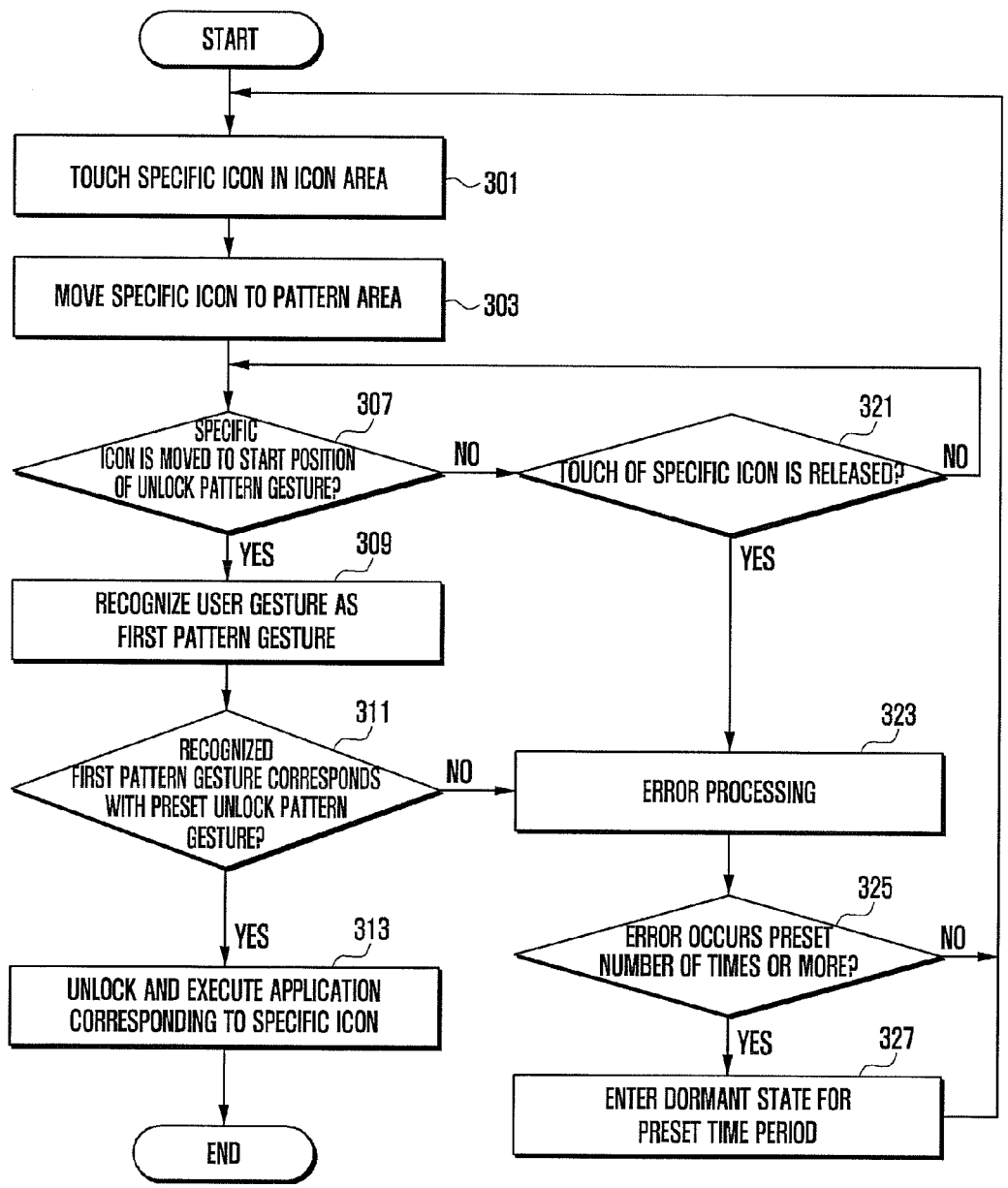
FIG. 3 illustrates a process of unlocking the mobile terminal of FIG. 1.

FIG. 3 illustrates a method of unlocking the mobile terminal of FIG. 1.

Referring to FIGS. 1 and 3, the controller 110 according to embodiments of the present disclosure recognizes that a specific icon of at least one icon included in the icon area is touched in block 301.

The controller 110 recognizes that a specific icon is moved to the pattern area in a state in which the touch is maintained in block 303. In this case, the controller 110 controls the display unit 142 to visually display a moving path of the specific icon. This is to prevent that a start position of an unlock pattern gesture is exposed to another person. That is, the present disclosure strengthens security because another person cannot find a start position of an unlock pattern gesture 121, even if a pattern input is exposed to another person.

The controller 110 determines whether the specific icon is moved to a start position of the unlock pattern gesture 121 (307). If the specific icon is moved to a start position of the unlock pattern gesture 121, the controller 110 recognizes a user's gesture input through the pattern area as a first pattern gesture input for unlocking in block 309. That is, the controller 110 ignores the user's pattern gesture input until the specific icon moves to a start position of the unlock pattern gesture 121 and recognizes the user's pattern gesture input later as the first pattern gesture.

The controller 110 determines whether the recognized first pattern gesture corresponds with a preset unlock pattern gesture in block 311. That is, the controller 110 determines whether the recognized first pattern gesture corresponds with a preset unlock pattern gesture 121. More particularly, the pattern gesture determination unit 112 of the controller 110 compares position information of pattern points included in the unlock pattern gesture 121 and position information of pattern points included in the recognized first pattern gesture and determines whether position information of pattern points included in the unlock pattern gesture 121 corresponds with position information of pattern points included in the recognized first pattern gesture.

If the recognized first pattern gesture does not correspond with a preset unlock pattern gesture in block 311, the process continues to block 323.

If the recognized first pattern gesture corresponds with a preset unlock pattern gesture, the controller 110 unlocks the mobile terminal and executes an application corresponding to the specific icon (313). In this way, the present invention can quickly and easily execute an application to execute at a lock screen through a simple and intuitive method of touching a specific icon and inputting a first pattern gesture on a pattern area without release of the touch. However, in other mobile terminals, after the mobile terminal unlocks at a lock screen, an icon corresponding to an application to execute should be touched. That is, in the other mobile terminals, inconvenience in which a plurality of steps should be performed to execute an application on a lock screen exists.

If the specific icon is not moved to a start position of the unlock pattern gesture 121 at step 307, the controller 110 determines whether a touch of a specific icon is released (321).

If a touch of a specific icon is not released, the process returns to step 307 and the above-described processes are repeated.

If a touch of a specific icon is released, the controller 110 performs an error processing (323). For example, the controller 110 controls the display unit 142 to output an error message window. In certain embodiments, the controller 110 controls the display unit 142 to change a color (e.g., from a green color to a red color) of a line displaying a moving path of an input pattern gesture and to notify of an error.

The controller 110 determines whether an error occurs the preset number of times or more in block 325.

If an error occurs less than the preset number of times, the process returns to block 301 and the above-described processes are repeated.

If an error occurs the preset number of times or more, the controller 110 controls the mobile terminal to enter a dormant state for a preset time period (327). For example, in a state in which the preset number of times is set to 5 times and in which the preset time period is set to 30 seconds, when an input of a pattern gesture for unlocking is wrong 5 times, the controller 110 controls the mobile terminal to enter a dormant state for 30 seconds. When the 30 seconds have elapsed, the controller 110 exits the dormant state and the process returns to block 301 and the above-described processes are repeated.

FIG. 4 illustrates screen captures for a method of unlocking the mobile terminal of FIG. 1.

Referring to FIGS. 1 to 4, in a state in which the display unit 142 is turned off, when a key input signal from the key input unit 130 is received, the controller 110 turns on the display unit 142 and controls to display a lock screen 401. The lock screen includes a pattern area 413 that receives a pattern gesture input for unlocking and an icon area 416 in which at least one icon representing an application is displayed. The pattern area 413 includes a plurality of pattern points 410 arranged in multi-row and multi-column layouts. The icons displayed in the icon area 416 may be changed by a user. FIG. 4 illustrates an example, but does not limit the present disclosure to the example shown in FIG. 4.

In a state in which a lock screen 401 is output, the user can move a specific icon (e.g., outgoing call icon 415) of the icon area 416 to the pattern area 413 using touch and drag. For example, the user may move the specific icon 415 to a start position 422 of the preset unlock pattern gesture 121, as shown in screen 402. In this case, the controller 110 visually displays (e.g., a straight line having a specific color) a moving path 424 of the specific icon 415, as shown in the screen 402. Further, the controller 110 controls to display to visually distinguish pattern points 423 positioned on a moving path of the specific icon 415 from other pattern points.

In a state in which the specific icon 415 is moved to the start position 422 of the unlock pattern gesture 121, as shown in the screen 402, the user can input a first pattern gesture 430 for unlocking, as shown in a screen 403. That is, the user can input a pattern gesture to correspond to the preset unlock pattern gesture 121.

When an input of the first pattern gesture 430 is complete (that is, if a touch of the specific icon 415 is released, the controller 110 determines whether the preset unlock pattern gesture 121 corresponds with the input first pattern gesture 430.

If the preset unlock pattern gesture 121 corresponds with the input first pattern gesture 430, the controller 110 unlocks the mobile terminal 100 and controls to execute an application corresponding to the specific icon 415. For example, the controller 110 controls the display unit 142 to output an outgoing call screen, as shown in a screen 404.

Although not shown in FIG. 4, as described in FIG. 3, if the preset unlock pattern gesture 121 does not correspond with the input first pattern gesture 430, the controller 110 performs an error processing. The error processing is performed through an error message window output and a color change of the moving path.

The present disclosure describes that a moving path of the specific icon 415 and a pattern gesture of the specific icon 415 are continuously displayed for an input action. This is to improve security by enabling a start point of a pattern to not be exposed to another person. However, the present disclosure is not limited thereto. For example, in another example of the present disclosure, when the specific icon 415 is moved to the start position 422 of the unlock pattern gesture 121, a display of the specific icon 415 is removed. This is notify the user that a moving path of the specific icon 415 arrives at a start position and to guide an input of the first pattern gesture for unlocking.

As described above, a method of unlocking a mobile terminal according to embodiments of the present disclosure can be embodied in a program command form that is performed through various computer means and can be recorded in a computer readable recording medium. The computer readable recording medium can include, individually or in combination, a program command, data file, and data structure. The program command/instruction recorded at a record medium is specially designed and formed for the present disclosure and be used by a person of ordinary skill in the computer software art. The computer readable recording medium includes a hardware device specially configured to store and perform a program command such as magnetic media such as a hard-disk, floppy disk, and magnetic tape, optical media such as CD-ROM and DVD, magneto-optical media such as a floptical disk, ROM, and a flash memory. Further, the program command includes a high-level language code that can be executed by a computer using an interpreter as well as a machine language code made by a compiler. In order to perform methods of the present disclosure, the above-described hardware device can be configured to operate as at least one software module.

In the foregoing description, embodiments of the present disclosure can quickly and simply execute a specific application through a continued touch input of one time at a lock screen and thus user convenience can be improved.

As described above, in a method and apparatus for unlocking a mobile terminal according to the present disclosure, a specific application can be immediately executed through a continued touch input of one time on a lock screen and thus user convenience can be improved.

Although the present disclosure has been described with examples, various changes and modifications may be suggested to one skilled in the art. It is intended that the present disclosure encompass such changes and modifications as fall within the scope of the appended claims.

What is claimed is:

1. A method of unlocking a mobile terminal, the method comprising:
outputting a lock screen comprising an icon area in which at least one icon representing an application is displayed and a pattern area configured to receive a pattern gesture input configured to unlock the mobile terminal;
sensing a touch signal that moves a specific icon displayed in the icon area to the pattern area;
determining whether a first pattern gesture for unlocking is inputted to the pattern area without release of the touch signal by:
upon determining that the specific icon is moved to the pattern area in a state in which the touch signal is maintained, refraining from recognizing a pattern gesture input through the pattern area until a time point at which the specific icon is moved to a start position of a preset unlock pattern gesture,
prior to completion of the first pattern gesture, determining whether the specific icon is moved to the start position of the preset unlock pattern gesture, and
recognizing the pattern gesture input through the pattern area from the time point at which the specific icon is moved to the start position as the first pattern gesture to a time point at release of the touch signal;
in response to determining the first pattern gesture is inputted, determining whether the input first pattern gesture corresponds with the preset unlock pattern gesture; and
unlocking, in response to determining the inputted first pattern gesture corresponds with the preset unlock pattern gesture, the mobile terminal and executing an application corresponding to the specific icon.

2. The method of claim 1, further comprising performing an error processing in response to determining the inputted first pattern gesture does not correspond with the preset unlock pattern gesture.

3. The method of claim 2, further comprising entering a dormant state in which a pattern gesture cannot be input for a preset time period when the error processing occurs at least a preset number of times.

4. The method of claim 1, further comprising:
performing an error processing when a touch is released in a state in which the specific icon is not moved to the start position of the preset unlock pattern gesture; and
entering, when the error processing occurs at least a preset number of times, a dormant state in which a pattern gesture cannot be input for a preset time period.

5. The method of claim 1, further comprising:
determining whether a second pattern gesture inputted through the pattern area without a touch of the specific icon corresponds with the preset unlock pattern gesture; and
unlocking, if the second pattern gesture corresponds with the preset unlock pattern gesture, the mobile terminal.

6. The method of claim 1, wherein the pattern area comprises a plurality of pattern points arranged in multi-row and multi-column layouts, and
the preset unlock pattern gesture is formed by connecting at least two pattern points.

7. An apparatus for unlocking a mobile terminal, the apparatus comprising:
an electronic display configured to display a lock screen comprising an icon area in which at least one icon representing an application is displayed and a pattern area configured to receive a pattern gesture input for unlocking;
a touch panel configured to recognize a touch input at the lock screen; and
a hardware controller configured to:
sense a touch signal for moving a specific icon displayed in an icon area of the lock screen to the pattern area,
prior to completion of the first pattern gesture, determine whether a first pattern gesture inputted to the pattern area without release of the sensed touch signal corresponds with a preset unlock pattern gesture by:
upon determining that the specific icon is moved to the pattern area in a state in which the touch signal is maintained, refraining from recognizing a pattern gesture input through the pattern area until a time point at which the specific icon is moved to a start position of the preset unlock pattern gesture,
determining whether the specific icon is moved to the start position of the preset unlock pattern gesture,
recognizing the pattern gesture input through the pattern area from the time point at which the specific icon is moved to the start position as the first pattern gesture to a time point at release of the touch signal,
unlock the mobile terminal in response to determining the first pattern gesture corresponds with the preset unlock pattern gesture, and
control to execute the application corresponding to the specific icon.

8. The apparatus of claim 7, wherein the controller is further configured to:
in response to determining the first pattern gesture does not correspond with the preset unlock pattern gesture, perform an error processing; and
in response to determining the error processing occurs at least a preset number of times, enter a dormant state in which a pattern gesture cannot be input for a preset time period.

9. The apparatus of claim 8, wherein the preset time period is 30 seconds.

10. The apparatus of claim 8, wherein the preset number of times is 5.

11. The apparatus of claim 7, wherein the controller is configured to:
perform an error processing when a touch is released in a state in which the specific icon does not move to the start position of the preset unlock pattern gesture, and
in response to determining the error processing occurs at least a preset number of times, enter a dormant state in which a pattern gesture cannot be inputted for the preset time period.

12. The apparatus of claim 7, wherein the controller is further configured to:
determine whether a second pattern gesture input through the pattern area without a touch of the specific icon corresponds with the preset unlock pattern gesture, and
in response to determining the second pattern gesture corresponds with the preset unlock pattern gesture, unlock the mobile terminal.

13. The apparatus of claim 12, wherein the controller is further configured to:
a pattern gesture setting configured to set the preset unlock pattern gesture for the unlocking.

14. The apparatus of claim 13, wherein the controller is further configured to:
a pattern gesture determining configured to:
recognize the first pattern gesture or the second pattern gesture input through the pattern area, and
determine whether the recognized first pattern gesture or recognized second pattern gesture corresponds with the preset unlock pattern gesture.

15. The apparatus of claim 13, wherein the controller is further configured to:
an unlocking configured, in response to determining the first pattern gesture corresponds with the preset unlock pattern gesture, to execute the application corresponding to the specific icon.

16. The apparatus of claim 15, wherein the controller is further configured to:
in response to determining the second pattern gesture corresponds with the preset unlock pattern gesture, unlocking the mobile phone.

17. The apparatus of claim 7, wherein the pattern area comprises a plurality of pattern points arranged in multi-row and multi-column layouts, and
the preset unlock pattern gesture is formed by connecting at least two pattern points.

18. The apparatus of claim 7, wherein the controller is further configured to cause the display to visually display a moving path of the specific icon in a specified color.

19. The apparatus of claim 7, wherein the controller is further configured to:
upon determining that the specific icon is moved to the pattern area in a state in which the touch signal is maintained:
repeatedly determine whether the specific icon is moved to the start position of the unlock pattern gesture until one of:
the time point at which the specific icon is moved to the start position of the unlock pattern gesture, or
the touch signal of the specific icon is released; and
in response to detecting release of the touch signal in a state in which the specific icon has not moved to the start position of the preset unlock pattern gesture, determining that the first pattern gesture is not inputted to the pattern area.

20. A method of unlocking a mobile terminal, the method comprising:
outputting a lock screen comprising an icon area in which at least one icon representing an application is displayed and a pattern area configured to receive a pattern gesture input configured to unlock the mobile terminal;
sensing a touch signal that moves a specific icon displayed in the icon area to the pattern area;
determining whether a first pattern gesture for unlocking is inputted to the pattern area without release of the touch signal by:
upon determining that the specific icon is moved to the pattern area in a state in which the touch signal is maintained, refraining from recognizing a pattern gesture input through the pattern area until a time point at which the specific icon is moved to a start position of a preset unlock pattern gesture,
determining whether the specific icon is moved to the start position of the preset unlock pattern gesture, and
recognizing the pattern gesture input through the pattern area from the time point at which the specific icon is moved to the start position as the first pattern gesture;
upon determining that the specific icon is moved to the start position of the unlock pattern gesture, removing a visual display of the specific icon from the pattern area;
in response to determining the first pattern gesture is inputted, determining whether the input first pattern gesture corresponds with the preset unlock pattern gesture; and
unlocking, in response to determining the inputted first pattern gesture corresponds with the preset unlock pattern gesture, the mobile terminal and executing an application corresponding to the specific icon.

* * * * *